United States Patent [19]

Baumgartner et al.

[11] 3,861,970

[45] Jan. 21, 1975

[54] PROPELLANT COMPOSITION CONTAINING BERYLLIUM HYDRIDE, NITROCELLULOSE AND NITRATE CO-PLASTICIZERS

[75] Inventors: Walter E. Baumgartner; Philip G. Butts, both of Redlands, Calif.

[73] Assignee: The United States of America as represented by the Secretary of the United States Air Force

[22] Filed: June 25, 1968

[21] Appl. No.: 740,834

[52] U.S. Cl..................... 149/19.8, 149/20, 149/94, 149/96
[51] Int. Cl................................................. C06d 5/06
[58] Field of Search............. 149/18, 19, 38, 94, 96, 149/19.8, 20

[56] References Cited
UNITED STATES PATENTS

| | | | |
|---|---|---|---|
| 2,995,430 | 8/1961 | Scharf | 149/36 X |
| 3,036,939 | 5/1962 | Camp | 149/19 |
| 3,068,129 | 12/1962 | Schaffel | 149/19 |
| 3,222,233 | 12/1965 | Matuszko et al. | 149/38 |
| 3,290,190 | 12/1966 | Godfrey et al. | 149/19 |
| 3,326,732 | 6/1967 | Scurlock et al. | 149/19 |
| 3,362,859 | 1/1968 | Sutton et al. | 149/96 |
| 3,389,026 | 6/1968 | Johnson | 149/19 |
| 3,445,304 | 5/1969 | Cahill et al. | 149/19 |

*Primary Examiner*—Benjamin R. Padgett
*Assistant Examiner*—E. A. Miller
*Attorney, Agent, or Firm*—Harry A. Herbert, Jr.; William J. O'Brien

[57] ABSTRACT

A composite, double-base, solid rocket propellant composition which utilizes beryllium hydride as a high energy fuel in combination with a nitro-nitrate ester plasticizer. The particular ester plasticizer used in the propellant composition serves to produce the high non-equilibrium flame temperatures needed for attaining high beryllium hydride combustion efficiencies.

4 Claims, No Drawings

PROPELLANT COMPOSITION CONTAINING BERYLLIUM HYDRIDE, NITROCELLULOSE AND NITRATE CO-PLASTICIZERS

BACKGROUND OF THE INVENTION

This invention relates to novel compositions of matter which are useful as solid rocket propellants. More particularly, this invention concerns itself with a composite, double-base, solid rocket composition which utilizes beryllium hydride as a high energy fuel component.

Liquid compositions, as the fuel-oxidant mixture for rocket motors, present serious problems. The use of liquid propellants requires considerable plumbing, valves, metering pumps and intricate controls in order to provide for the effective delivery of the fuel and oxidant to the combustion chamber in the proper ratio. Also, the liquids employed are extremely corrosive and are subject to loss. Therefore, rocket motors which employ liquid propellants are not deemed reliable when standing for long periods of time in a ready-to-go condition. Furthermore, handling the corrosive liquids is a hazardous, time-consuming and cumbersome job, which oftentimes precludes their use in tactical weapon systems in the field.

In contradistinction to a liquid propellant system, the solid propellant motor is inherently very simple since the ratio and distribution of fuel, oxidant and additives are fixed when the propellant is prepared. Thus, the solid propellant system requires no plumbing, valves, or controls and contains no mechanical moving parts subject to malfunctioning. The solid propellant rocket, in general, is characterized by a relatively long storage life and presents little or no problem from a materials handling point. Its easy in handling and high reliability for instant use makes it especially suitable for tactical and strategic weapon systems in the field. A further advantage of the solid propellant rocket is that the relatively rigid propellant charge aids in the support of the combustion chamber during handling and when in use such that a lighter-weight case can be employed. The saving in weight plus the elimination of the type of hardware required for a liquid propellant system provides a bigger pay-load.

Conventional composite solid propellant compositions generally consist of a finely ground inorganic oxidant dispersed in a matrix of either a plastic, resin or elastomeric binder. The binder also serves as the reductant-fuel of the system. Double base propellants are those which include a second combustible ingredient as a reductant fuel in addition to the plastic binder fuel.

The utilization of solid propellants is obviously advantageous because of their desirable characteristics. However, the development of solid propellant compositions to meet specific requirements is not an easy task since the modern rocket motor requires compositions which are capable of producing high specific impulse efficiencies and equilibrium flame-temperatures. With the present invention, however, specific impulse efficiencies at a theoretical specific impulse of 300 lb. sec/lb or higher can be achieved with a solid propellant composition containing beryllium hydride as a high energy fuel component.

SUMMARY OF THE INVENTION

In accordance with the present invention, it has been found that a composite, double-base, solid propellant can be formulated which contains beryllium hydride as a high energy fuel. The beryllium hydride is used in combination with specific nitronitrate ester plasticizers. The latter serves to produce the high non-equilibrium flame temperatures necessary for attaining a high beryllium hydride combustion efficiency with propellants containing beryllium hydride in amounts in excess of about 10 percent by weight.

Accordingly, the primary object of this invention is to provide an improved solid propellant composition.

Another object of this invention is to provide a novel solid propellant composition having a high specific impulse.

A further object of this invention is to provide a doublebase solid propellant composition which utilizes beryllium hydride as a high energy fuel in combination with specific nitro-nitrate ester plasticizers.

Other objects and advantages of this invention will be apparent from the following detailed description thereof.

DESCRIPTION OF THE PREFERRED EMBODIMENT

Broadly speaking, the solid propellant composition of this invention is a double-base propellant comprising beryllium hydride in combination with a specific nitro-nitrate ester plasticizer selected from the group consisting of nitroisobutanetriol trinitrate (NIBTN), 2,2-dinitropropanediol dinitrate (DNPDN), and nitroethylnitrate (TNEN). In addition, the propellant contains the usual components conventionally found in solid propellants. For example, it may contain an active co-plasticizer such as diethyleneglycol dinitrate (DEGDN) or ethlyeneglycol dinitrate (EGDN); a solid oxidizer such as an ammonium, sodium or potassium nitrate; or a potassium, lithium or ammonium perchlorate; a binder such as nitrocellulose, and the usual stabilizers, additives and processing aids conventionally employed in the formulation of solid propellants.

The following examples describe the invention with greater specificity with Example 1 indicating various modifications which come within the scope of the invention. The remaining examples present specific embodiments.

The propellant may also contain additional fuels such as beryllium metal or aluminum. The beryllium hydride can be in the form of pyrolytic material, dense crystalline material or oxidizer coated form, as well as mixtures thereof. All percentages are percent by weight unless otherwise indicated.

| Example 1 | |
|---|---|
| Plastic Binder | 9–14% |
| Co-Plasticizer | 3–15% |
| Oxidizer | 0–35% |
| Beryllium Hydride Fuel | 15–24% |
| Nitro-Nitrate Ester Plasticizer | 10–40% |

| Example 2 | |
|---|---|
| Nitrocellulose | 10.8% |
| Diethyleneglycol dinitrate | 3.8% |
| Ammonium Perchlorate | 35.2% |
| Beryllium Hydride | 15.0% |
| Nitroisobutanetriol Trinitrate (NIBTN) | 35.2% |

| Example 3 | |
|---|---|
| Nitrocellulose | 10.0% |
| Diethyleneglycol dinitrate | 5.1% |
| Ammonium Perchlorate | 34.9% |
| Beryllium Hydride | 16.2% |
| 2,2-dinitropropanediol dinitrate | 33.8% |

-Continued

Example 1
(DNPDN)

Example 4

| Nitrocellulose | 10.5% |
|---|---|
| Ethyleneglycol dinitrate | 4.4% |
| Potassium perchlorate | 31.1% |
| Beryllium Hydride | 17.7% |
| Nitroethylnitrate (TNEN) | 36.3% |

The formulation of Example 2 had a theoretical $Isp_{eq}$ of 301 lb. sec/lb. and a non-equilibrium flame temperature of 2550°–2600°K. The latter is defined as the idealized flame temperature that would exist prior to ignition of the nascent beryllium metal, and is computer calculated by programming the metal as an exhaust species.

From the foregoing description it becomes apparent that the present invention is most effective in producing a composite double-base propellant capable of achieving very high specific impulses which is especially adaptable for use with solid rocket motors. The high impulse efficiencies are accomplished by utilizing beryllium hydride in combination with specific nitronitrate ester plasticizers.

The invention has been described with particular reference to specific embodiments thereof. It is to be understood, however, that the description of the invention is for the purpose of illustration only, and it is not intended to limit the invention in any way.

What is claimed is:

1. A solid rocket propellant composition which comprises about 9–14 percent by weight of nitrocellulose, 3–15 percent by weight of an active co-plasticizer selected from the group consisting of diethyleneglycol dinitrate and ethyleneglycol dinitrate, 0–35 percent by weight of an inorganic oxidizer, 15–24 percent by weight of beryllium hydride and 10–40 percent by weight of a nitro-nitrate ester plasticizer selected from the group consisting of nitroisobutanetriol-trinitrate, 2,2-dinitropropanediol dinitrate and nitroethylnitrate.

2. A propellant composition in accordance with claim 1 wherein said ester plasticizer is nitroisobutanetriol trinitrate and said co-plasticizer is diethyleneglycol dinitrate.

3. A propellant composition in accordance with claim 1 wherein said ester plasticizer is 2,2-dinitropropanediol dinitrate and said co-plasticizer is diethyleneglycol dinitrate.

4. A propellant composition in accordance with claim 1 wherein said ester plasticizer is nitroethylnitrate and said co-plasticizer is ethyleneglycol dinitrate.

* * * * *